United States Patent
Chheda

(10) Patent No.: US 7,602,722 B2
(45) Date of Patent: Oct. 13, 2009

(54) MOBILE ASSISTED FAST SCHEDULING FOR THE REVERSE LINK

(75) Inventor: Ashvin Chheda, Plano, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 1333 days.

(21) Appl. No.: 10/310,401

(22) Filed: Dec. 4, 2002

(65) Prior Publication Data

US 2004/0109424 A1 Jun. 10, 2004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .............. 370/236; 370/331; 370/232; 455/437; 455/442

(58) Field of Classification Search .............. 370/328, 370/331, 332, 333, 229, 232, 236, 334; 455/67.11, 455/67.12, 67.13, 67.14, 63.2, 436–453, 455/63.1

See application file for complete search history.

(56) References Cited

U.S. PATENT DOCUMENTS

| | | | | |
|---|---|---|---|---|
| 5,170,485 A * | 12/1992 | Levine et al. | ............... | 455/437 |
| 5,822,318 A * | 10/1998 | Tiedemann et al. | .......... | 370/391 |
| 5,923,650 A * | 7/1999 | Chen et al. | ................... | 370/331 |
| 6,397,070 B1 * | 5/2002 | Black | ......................... | 455/453 |
| 6,411,817 B1 * | 6/2002 | Cheng et al. | ................. | 455/522 |
| 6,741,862 B2 * | 5/2004 | Chung et al. | .............. | 455/452.1 |
| 6,999,425 B2 * | 2/2006 | Cheng et al. | ................. | 370/252 |
| 7,058,035 B2 * | 6/2006 | English | ...................... | 370/332 |
| 7,120,134 B2 * | 10/2006 | Tiedemann et al. | .......... | 455/522 |
| 7,315,527 B2 * | 1/2008 | Wei et al. | ..................... | 370/328 |
| 2002/0193118 A1 * | 12/2002 | Jain et al. | ..................... | 455/453 |
| 2003/0086366 A1 * | 5/2003 | Branlund et al. | ............. | 370/208 |
| 2003/0086397 A1 * | 5/2003 | Chen | ............................ | 370/335 |
| 2004/0202136 A1 * | 10/2004 | Attar et al. | ................... | 370/333 |
| 2005/0107090 A1 * | 5/2005 | Hosein | ........................ | 455/453 |
| 2005/0180450 A1 * | 8/2005 | Gaal et al. | ................... | 370/437 |

* cited by examiner

Primary Examiner—Edward Urban
Assistant Examiner—Christian A Hannon
(74) Attorney, Agent, or Firm—Garlick Harrison & Markison; James A. Harrison

(57) ABSTRACT

A wireless communication network is able to perform fast reverse link scheduling by providing data to a user terminal to enable it to select parameters that a base station is to use when scheduling a reverse link transmission. The user terminal that is in hand-off and is communicating with a plurality of base stations selects among the received network measured parameters from a plurality of base station transceiver sets to prompt each base station transceiver set to utilize a set of network parameters that will not likely cause excessive interference or drop offs in any of the cells supported by the base station transceiver set with which the user terminal is communicating. Responsive to receiving the user terminal selected network parameters, each BTS determines when to transmit a burst of data, the data rate and a power level for the data for the user terminal 176. While the network parameters transmitted by the BTSs to the user terminal may comprise many different types of signals, the described embodiment includes received reverse link signal energy measurements and rise over thermal (ROT) measurements.

27 Claims, 7 Drawing Sheets

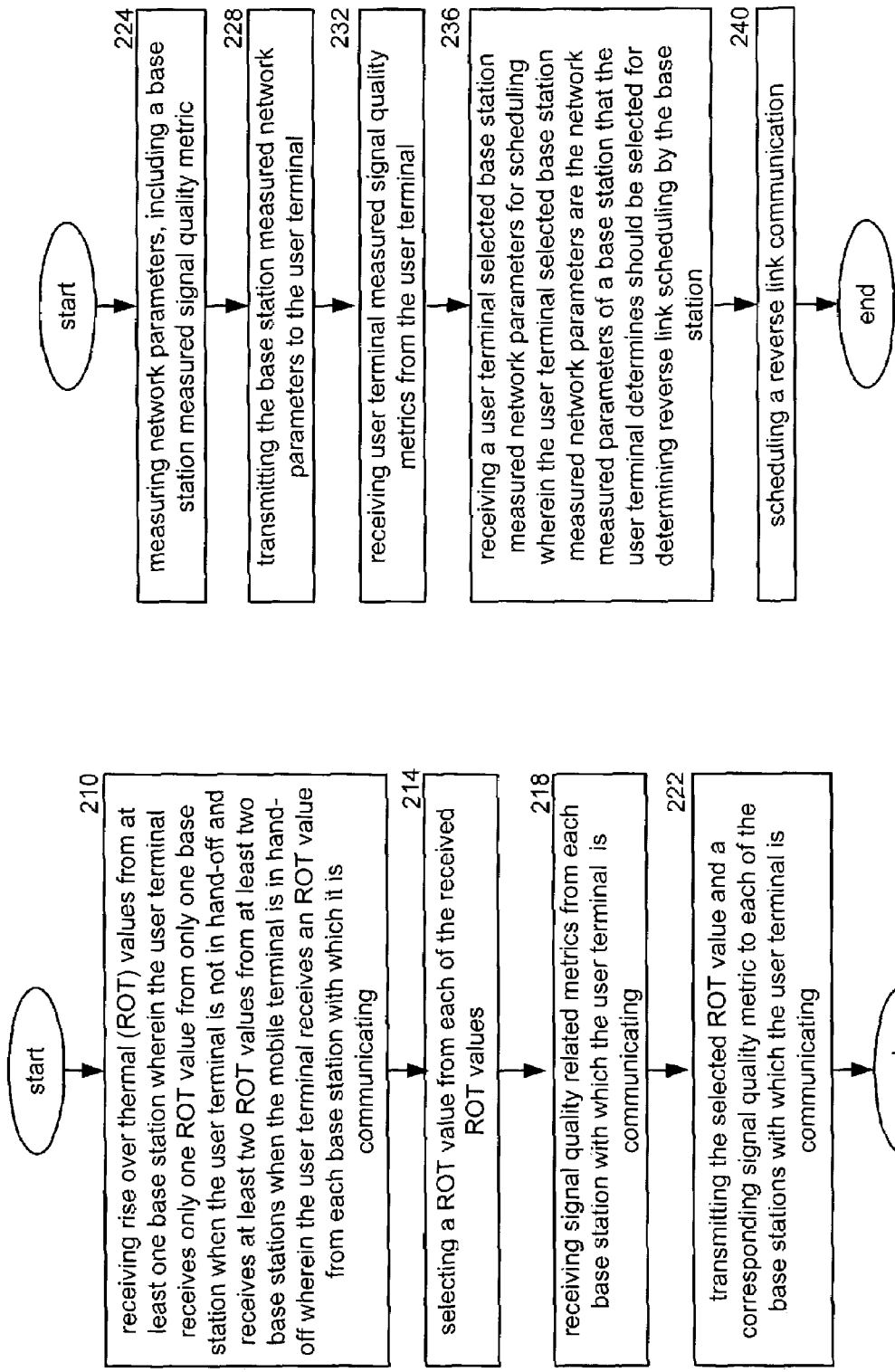

MOBILE ASSISTED FAST SCHEDULING FOR THE REVERSE LINK

TECHNICAL FIELD OF THE INVENTION

The present invention relates generally to communication systems and particularly to scheduling communications between mobile stations and base stations in a wireless communication system.

DESCRIPTION OF RELATED ART

Wireless communication service providers, as well as Internet service providers, face some difficult challenges as the various networks are increasingly modified to work together to provide seamless end-to-end call connectivity across the various platforms. Ever-increasing residential dial-up subscribers demand available modem (or ISDN) ports, or threaten to take their business elsewhere. To meet this demand, Internet service providers are deploying a large number of complex, port-dense network access servers (NASs) to handle thousands of individual dial-up connections. As such, small and large, as well as private and public, wireless data networks are being created to seamlessly interact with large wire line networks to enable users to establish point-to-point connections independent of terminal type and location. Traditionally, however, voice networks have paved the way for the creation of data networks as users loaded the voice networks trying to transmit data, including streaming data (video and audio). Initially, traditional Public Switched Telephone Networks (PSTNs) were used for data transmissions but have been largely supplanted by packet data networks, including various versions of the Internet.

The wireless domain has had a parallel history. Initial voice networks, including Advanced Mobile Phone Service (AMPS), Time Division Multiple Access (TDMA), including North American TDMA and Global System for Mobile Communications (GSM) networks, were used to conduct data in a limited capacity. These networks are being replaced, however, by newer wireless data-only or data-centric networks, as well as mixed data and voice networks. The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, medium access control (MAC) layer operations, link layer operations, signaling protocols, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of co-channel and adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include mobile station controllers (MSCs), base station controllers (BSCs) and base station transceiver sets (BTS) that jointly operate to communicate with mobile stations over a wireless communication link. BSCs and BTSs collectively are referred to as BSs or base stations. Examples of common networks include GSM networks, North American TDMA networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices.

To establish a wireless communication link in traditional wireless voice networks, the MSC communicates with the BSC to prompt the BTS to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call. The authentication process includes, for example, communicating with a Home Location Register (HLR) to obtain user and terminal profile information.

The next generation of cellular networks presently being developed are being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless channel, as well as to be able to receive continuous bit rate data, including so called "streaming data". Accordingly, different systems and networks are being developed to expand such capabilities and to improve their operational characteristics.

One example of a system that is presently being deployed with voice and data capabilities is the cdma2000 network. The cdma2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

IS-95 while designed primarily for voice services can support simple data type applications, such as short message service (SMS). It can support wireless Internet access through circuit switched data mode, with the data rate limited to 14.4 kb/s. However, it is unable to provide majority of multi-media services users have come to expect with typical home based broad-band connections to the Internet.

1xRTT improves upon the design of IS-95. Voice capacity is approximately doubled, and in addition 1xRTT supports packet based access to the Internet. The data rate in 1xRTT is limited to 614.4 kb/s. This is the maximum available rate in theory to one user, though in practice a user will never get such a rate. On average, users may expect as much as 153.6 kb/s for brief periods of time, with an average rate of about 80 kb/s. As a result certain data applications are still not viable in 1xRTT, such as video conferencing. 1xRTT is backwards compatible to IS-95.

One data-only network that is being developed is defined by the 1xEVDO standard, also known as IS-856. The 1xEVDO standard defines a time burst system utilizing a 1.25 MHz carrier that is set at a carrier frequency that is adjacent to the frequencies used by the voice networks. In one particular network, a 1.67 millisecond (mS) burst is used for the forward link in a 1xEVDO network. Typical 1xEVDO networks include a Packet Data Service Node (PDSN) for performing routing and switching for a data packet or data packet stream, an Access Network Controller (ANC) that establishes and manages the wireless communication link with the mobile terminal, and a Packet Control Function (PCF) that is largely an interface device for converting signals between the packet domain and a wireless network that will be used for the communication link.

The 1xEVDO network is optimized for forward link data applications. The next generation of 1xRTT networks that are being deployed can communicate with voice and data networks but do not process data as efficiently as the networks formed according to the 1xEVDO standard. Newer networks are also being designed and have evolved from the 1xEVDO standard, including 1xEVDV (IS-2000 Release C), which is for transmitting data as well as voice.

The 1xEVDO networks that have been previously described are not formed, however, to interact seamlessly between the voice and data networks. For example, the 1xEVDO networks do not have, or fully utilize, Signaling System Number 7 (SS7) type network components to assist with call setup, user and mobile station authentication, call routing, and feature delivery. The 1xEVDO networks are formed to carry data only and do not include the full functionality and capabilities of wireless voice networks. The infrastructure of the 1xEVDO network is different and simpler than SS7-based voice networks (wire line or wireless).

One problem with present 1xEVDO and 1xRTT networks is that the PDSN may become overloaded. Current designs do not, however, provide an efficient manner to respond to overload conditions for the PDSN. There exists a need, therefore, for a system and method of responding to a situation wherein the PDSN is overloaded, that is efficient and also reduces the consumption of network resources due to the overloaded PDSN. The Federal Communications Commission (FCC) governs the use of the radio frequency (RF) spectrum, deciding which industry gets certain frequencies. Since the RF spectrum is limited, only a small portion of the spectrum can be assigned to each industry. The assigned spectrum, therefore, must be used efficiently in order to allow as many frequency users as possible to have access to the spectrum.

In North America, two technologies have been designed as an evolution from 1xRTT. The first technology is 1xEVDO as mentioned above, which is geared towards data only application and is not backwards compatible to 1xRTT. This solution is designed to offer a user a peak throughput of 2.45 Mb/s in the forward link. The second technology is an evolution of 1xRTT, and is also known as cdma2000 Release C, or 1xEVDV. This technology is backwards compatible to 1xRTT, and as such can offer voice and data services to the users. The peak rate offered by this second technology is 3.09 Mb/s. These two technologies are able to offer such high peak rates in the wireless channel by a number of design changes and optimizations.

Higher order adaptive modulation is incorporated in the physical layer design. These enhanced technologies use higher modulation in bit to symbol mapping. The modulations in use are quadrature phase shift keying (QPSK), 8-ary phase shift keying (8-PSK), and 16-quadrature amplitude modulation (16-QAM). The modulation is also adaptive, in the sense that the selection is dynamic and depends on the channel conditions at the time of packet transmission.

The concept of soft handoff is eliminated in the forward link for the high speed data applications. Mechanisms are designed in the system to allow very fast transitions from one cell site to another adjacent cell site when the channel conditions of the adjacent cell site become better than the current cell site in use by the wireless data terminal. This is also known as fast cell site switching.

Channel estimation feedback is used by the data terminal to either inform the network the data rate that the channel can instantaneously support between network and terminal (1xEVDO), or to inform the network of the forward channel conditions in the form of signal to noise metrics, with which the network can determine the instantaneous supportable rate between network and terminal (1xEVDV).

Hybrid adaptive repeat request (H-ARQ) schemes are used by the system to further improve the forward link transmission process. In 1xRTT, the radio link protocol is used, where the packet is re-transmitted if in error. In these enhanced technologies, segments of the packet are transmitted one at a time. These segments include original bits and parity bits, i.e. bits encoded by a channel encoder such as Turbo coder. If the packet can be successfully decoded, then a request to cease transmission of that packet is sent, if not the next segment is transmitted. The original packet is maintained in the registers and is soft combined with the next segment. This process is a form of early termination.

Fast pipe scheduling schemes are used to achieve very high data rates. This concept uses a time division multiplex (TDM) approach on the high data rate pipe. That is, the entire packet data channel is allocated to one (1xEVDO and 1xEVDV) or two (1xEVDV) users at a time. This enables the system to grant 2+Mb/s data rate to a user for a period of time. If the channels were always shared, this would not be possible.

Multiple access modulation techniques are some of the most efficient techniques for utilizing the RF spectrum. Examples of such modulation techniques include TDMA, frequency division multiple access and CDMA. CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

A form of frequency diversity is obtained by spreading the transmitted signal over a wide frequency range. Since only 200-300 kHz of a signal is typically affected by a frequency selected fade, the remaining spectrum of the transmitted signal is unaffected. A receiver that receives the spread spectrum signal, therefore, will be affected less by the fade condition. In addition, such a system has good performance in cases where interference may occupy a narrow-band. In a CDMA-type radiotelephone system, multiple signals are transmitted simultaneously at the same frequency. A particular receiver then determines which signal was intended for that receiver by a unique spreading code in the signal. The signals at that frequency, without the particular spreading code intended for the particular receiver, appear as noise to that receiver.

Because CDMA networks employ a system in which all transmissions occur in the same frequency band, it is well known that it is important to transmit at the lowest possible power that allows for the delivery of a communication signal at a certain level of accuracy or grade of service criteria. The reason that it is important for base stations and mobile stations to transmit with a minimal level of power on the forward and reverse links, is that each transmission adds to the noise level for all other receivers. In addition, if the per user power on the forward link is minimized there is more power available at the sector power amplifier for other users, thereby increasing the capacity of the system. Similarly, on the reverse link, if less power is used, apart from the interference benefits mentioned above, the mobile station can extend its battery life and/or range of transmission. One cost of reducing transmission power levels, however, is that the signal quality degrades with the lower power level.

Allowing signal quality to degrade will reduce transmission power levels, which reduces noise and interference to other users. However, this is unacceptable from a user's perspective when the signal quality degrades past a certain point. Improving signal quality beyond a certain point, on the other hand, does little to improve the user's perception of quality, but would greatly increase transmission power levels, which, in turn, would increase noise and interference to other users, causing their required power levels to increase in response. Ultimately, system throughput capacity is degraded in this scenario. Thus, it is desirable to transmit at a power level that is above a first threshold to maintain a desired signal quality and below a second threshold to avoid unnecessarily interfering with other users.

While power control is an especially important aspect of every CDMA network, the issue of power control is pertinent in any wireless communication network that is likely to have a significant number of users for the same reasons it is so critical in a CDMA network. Generally, the greater the number of users, the greater the overall noise and interference to other users. For example, a mobile station transmitting on the reverse link to the base station must, at a minimum, transmit at a power level sufficient to overcome thermal noise and background interference (noise) for the communication signals to be received and demodulated by the base station. As more users in the area of the mobile station communicate at the same time, the overall noise level increases thereby increasing a required transmission power level of the mobile station for its reverse link communication signal to successfully reach the base station. As the number of active users in the cell increase, the reverse link loading will increase. This reverse link loading is also known as the rise over thermal (ROT) and is a metric or measurement that represents the total received power in the frequency band over the thermal noise floor.

In multi-user networks having a large number of users wanting access to network resources, the order in which users are allowed to access the network resources for a communication becomes a significant aspect of network design. In general, without scheduling, noise would increase as multiple users attempt to communicate at the same time, limiting each of the users achievable data rate. If a system is implemented in which users are not scheduled in their attempt to communicate over a channel, then some users may not relinquish resources thereby not allowing others to communicate (or at least communicate on a timely basis). Thus, as a matter of fairness, scheduling algorithms are implemented in communication networks for allowing a more fair use of network resources.

There are several different types of scheduling algorithms that are in use. The simplest, of course, is a round robin algorithm in which users are given an equal amount of time and are scheduled as their turn arrives. Round robin algorithms are simplest to implement and have the simplest logic. The advantage of this method is that the waiting time is minimized. However, whenever a user's turn arrives it is scheduled and whatever rate is can sustain based on the channel condition is granted. Thus, it can be seen that this method does not optimize the system throughput and the system throughput will less than the maximum.

Another scheduler algorithm is the best-rate scheduler. In this scheme, the highest pending request is considered. That is, the user which can sustain the best rate due to the best channel conditions and is requesting a channel due to data in its buffer is scheduled for a unit of time. After this the system re-evaluates the list of pending users to decide which can sustain the highest rate and that user is now granted the channel for a unit of time. This method maximizes the sector throughput, but is not fair as some users may never get the channel due to their disadvantaged channel conditions. Other algorithms are optimized to minimize delay to support transmission of real-time data. Delay optimized algorithms, however, are often inefficient and do not maximize throughput. Other algorithms, therefore, are made to maximize throughput. Maximizing throughput is, in the abstract, desirable except that delay constraints for a data transmission may not be satisfied. For example, data packets carrying voice in "Voice over IP" networks can only withstand a certain amount of delay before the communication becomes difficult for the users. Thus, fair access to the network includes providing access that considers these various operational parameters or requirements.

Another commonly used scheduler that attempts to balance fairness and at the same time improve data throughput is the proportional fair scheduler. This scheduler attempts to increase system throughput by increasing the average throughput of each user. This scheduler is more complicated than the round robin. The scheduler must maintain a history of each active terminal's average data rate over a predetermined window (Average Rate of user k). In addition, each terminal is communicating some metric with which the scheduler can determine the instantaneous rate that can be supported by the channel between the network and terminal (Rate of user k). The scheduler then schedules for a time slot the terminal which maximizes the ratio of instantaneous rate to average rate (rate of user k/average rate of user k). This increases throughput of the overall system as well as the individual users. This scheme also maintains fairness by never allowing a user to get starved in terms of access to the channel. As a user gets starved, the average throughput of that user reduces, which means at each scheduling instant, the ratio increases as long as the instantaneous rate that is possible with the user stays the same or increases.

Another fundamental gain that scheduling provides in the wireless domain is the use of multi-user diversity. In general, with a large enough pool of users the channel can also be assigned to the set of users with the better channels, i.e. the channels in an up-fade situation. Eventually, as some of those users experience a down-fade, it can be expected statistically, that some of the users previously experiencing a down-fade, now experience an up-fade. Hence, these users can now be considered for the channel.

Fairness does not necessarily mean, of course, that every user gets the same priority and an equal level of access. Access is regulated by scheduling algorithms wherein certain types of data and communications are given priority over others. Additionally, some users are given priority over other users. For example, police and other users that provide public service are given priority given the importance of the role being performed by the user. Similarly, in some networks, users are allowed to pay for differing amounts of access and priority. A user that downloads real-time continuous bit rate data (and has paid for a pipeline that enables the continuous bit rate data to be downloaded in a real-time basis) might be given priority over a user that, for example, is merely downloading or uploading an e-mail or other text message.

Scheduling also is important to achieve network efficiency and, for example, to maximize network throughput. Thus, as multiple users seek access to a network, a scheduler provides access to maximize network throughput while also considering quality of service considerations, such as the type of service level agreement a user has or even the identity of the user.

In most multi-user wireless communication networks, as well as wired networks, a communication controller schedules communications by the various terminals in the network. In a wireless communication network, a base station controller typically performs the task of scheduling reverse link communications from the mobile stations to the BTSs. While a BTS could easily schedule a reverse link communications in its cell, the BTS cannot schedule reverse link communications in adjacent cells serviced by other BTSs. For a mobile station that is in hand-off, meaning that it is communicating with two or more BTSs as it transitions from one cell to another (communicating with one BTS to communicating with another BTS), the scheduling becomes more difficult. Accordingly, most wireless networks are developed to allow the base station controller (BSC) to perform scheduling among the various BTSs because it is able to coordinate the communications there between.

Whenever a base station schedules a reverse link transmission from the mobile station, and more particularly a data packet transmission from a mobile data terminal, it specifies a data rate and a corresponding power level. The data rate and power level are typically related. The base station, as a part of scheduling the reverse link communication, must determine an appropriate power level and hence rate to overcome thermal noise as well as overall noise from all communications. In other words, the received signal power level must be able to sustain the data communication given the level of ROT in the system for the scheduling time instant. In addition, the result of granting the transmission of the user must not overcome a specified ROT outage threshold in the system. Overcoming this threshold may increase the probability that other users, such as voice users, in the sector may not be able to close the reverse link reliably even when transmitting at maximum allowed power. One problem with scheduling algorithms that are performed by a base station controller, however, is that the entire process introduces delay that exceeds some communication delay requirements. Because the BTS must generate signals defining operational parameters and must transmit the same to the BSC, and because the base station controller must receive such signals from a plurality of BTSs, the total amount of time that elapses may well approach five hundred milliseconds. For some communications, a scheduling algorithm that takes so long may be unacceptable because the data cannot be scheduled and transmitted fast enough to satisfy its throughput and delay requirements. A need exists, therefore, for a system that performs scheduling, especially in a hand-off situation, that satisfies even the most stringent data delay and throughput requirements.

BRIEF SUMMARY OF THE INVENTION

A wireless communication network is able to perform fast reverse link and forward link scheduling by providing data to a user terminal to enable it to select parameters that a base station is to use when scheduling a reverse link transmission and by providing scheduling metrics to the user terminal for it to forward to at least one other base station. By sending network measured parameters to the user terminal, along with routine signaling, the user terminal that is in hand-off and is communicating with a plurality of base stations is able to select among the received network measured parameters from a plurality of base station transceiver sets (BTSs) to prompt each base station transceiver set to utilize a set of network parameters that will not likely cause excessive interference or outage in any of the cells supported by the base station transceiver set with which the user terminal is communicating. Outage is the failure of a user terminal to successfully transmit its reverse link signals to the base station because of noise levels that are too high for its transmitted power level to overcome. By sending scheduling metrics to the user terminal to forward to at least one other base station, the at least one other base station is able to more optimally schedule a forward link communication for a user terminal that is in the process of being handed off to it.

Generally, a wireless network comprises a plurality of cells, each served by corresponding base station transceiver sets in which each performs its own reverse link scheduling. Thus, responsive to receiving the user terminal selected network parameters, each BTS determines when to transmit a burst of data, the data rate and a power level for the data for the user terminal. The manner in which such scheduling decisions are made can be by any known algorithm, as discussed before, including round robin, an algorithm that minimizes delay, an algorithm that maximizes throughput, or an algorithm that accounts for fairness in light of many factors, including service level agreements between the user and the network providers.

While the network parameters transmitted by the BTSs to the user terminal may comprise many different types of signals, the described embodiment includes received reverse link signal energy measurements (or alternatively, signal-to-noise ratios) and rise over thermal (ROT) measurements. It is understood, however, that other equivalent metrics may also be utilized. The user terminal, upon receiving the network parameters from each of the BTSs, compares the network parameters signals to select between the two for use in scheduling. In the described embodiments of the invention, the user terminal selects the network parameters from a BTS whose ROT value is greatest in magnitude. By selecting the ROT value that is greatest in magnitude, the base stations, when receiving the selected ROT value, will use the ROT value (in most cases) as it schedules the reverse link transmission. As a higher ROT typically results in the base station scheduling data at a lower data rate, the corresponding transmission power level is likely to be lower thereby reducing the likelihood of outage or excessive interference.

Thereafter, the selected set of network parameters signals are transmitted to each of the BTSs with which it is communicating while in a hand-off mode of operation. The user terminal further transmits an indication of the amount of data that is in a buffer awaiting uploading or reverse link transmission and the power level for its last reverse link transmission or average power level for reverse link transmission over configurable window.

Generally, a base station seeks to transmit at a high throughput rate to satisfy its customers and maintain quality of service. Thus, a base station would tend to schedule a reverse link transmission from the user terminal at a data rate and power level that would not cause outage or excessive interference within the cell served by BTSs in communication with the user terminal while it is in hand-off. Rather than have each BTS transmit all necessary data to a central controller, such as a base station controller, the user terminal using logic defined therein, selects a set of network parameters whose values (e.g., ROT and corresponding SNR), when used in scheduling, would not likely cause drop off-or excessive interference in any of the cells served by the BTSs with which it is communicating while in hand-off.

The invention thus includes a scheduler that provides a more efficient process for scheduling reverse link communications. Additionally, however, forward link transmissions may also be improved. The inputs to and functions of the scheduler may vary from infrastructure vendor to another and from one scheduling algorithm to another. In general, the QoS profile of each user is required; that is, the class of the user, for instance platinum, gold, silver, etc. This may be used to weight the priority of scheduling the channel to such a user. The user history is also input into the scheduler. The scheduler must keep track of when the user was last scheduled to prevent starvation, and the average throughput of that user. The traffic model may also be input. System requirements may be input. For example in 1xEVDV, both voice and data are used. It may be that the operator does not want voice services to be disrupted as a result the scheduler must incorporate a metric or measure of the current voice traffic in the sector. The capability of the mobile may be input to the scheduler. For instance, some mobiles may not be able to sustain certain rates over a certain period of time. Also, most importantly, the radio resources availability is input to the scheduler.

The scheduler primarily determines when to transmit data to a particular user, and when to stop transmitting data to the user, and at what rate. However, the scheduler may also be required to maintain buffers. Each active user may be assigned a buffer, with which incoming data packets are queued. The scheduler may use the amount of data in the buffer to limit the data rate assigned. In other words there is not point assigning a 307.2 kb/s channel for 20 ms, with only one byte of data in the buffer.

The above descriptions relating to scheduling are applicable to both the high speed forward link channel and high speed reverse link channel. In the forward direction, the network required feedback from the terminals in a particular sector to determine how and who to schedule. Typically, the base station performs the scheduling amongst users in the sector. For high speed data channel in the forward link, the base station can schedule as soft handoff is not used, that is coordination among the base stations is not required. As the user transitions, fast feedback is used to change the serving sector. The scheduling of the user is not performed by the new sector. In some cases scheduling metrics may be transferred from one base station to the other by the use of the base station controller. Due to the inherent delays associated in the network, the time taken to transfer the scheduling metrics from one base station to another via the common base station controller can take appreciable amount of time. Hence, the new base station cannot properly schedule the user until it receives the scheduling metrics from the old base station. Thus, it may schedule the user differently than it otherwise would have. Some examples of user metrics sent to the new BTS via the mobile terminal, are the average data rate of the user over some pre-specified time, the average packet delay for that user over some pre-specified time, the last time the packet data channel was assigned to the user. This information can be used by the new base station to schedule the user in amongst the other active users it is currently serving.

BRIEF DESCRIPTION OF THE SEVERAL VIEWS OF THE DRAWINGS

A better understanding of the present invention can be obtained when the following detailed description of the preferred embodiment is considered with the following drawings, in which:

FIG. 5 is a flow chart illustrating a method performed by a user terminal as a part of scheduling a reverse link transmission according to one embodiment of the present invention;

FIG. 6 is a flow chart of an alternate embodiment of the invention for scheduling reverse link transmissions as performed by a base station transceiver set.

DETAILED DESCRIPTION OF THE INVENTION

Figure 1:
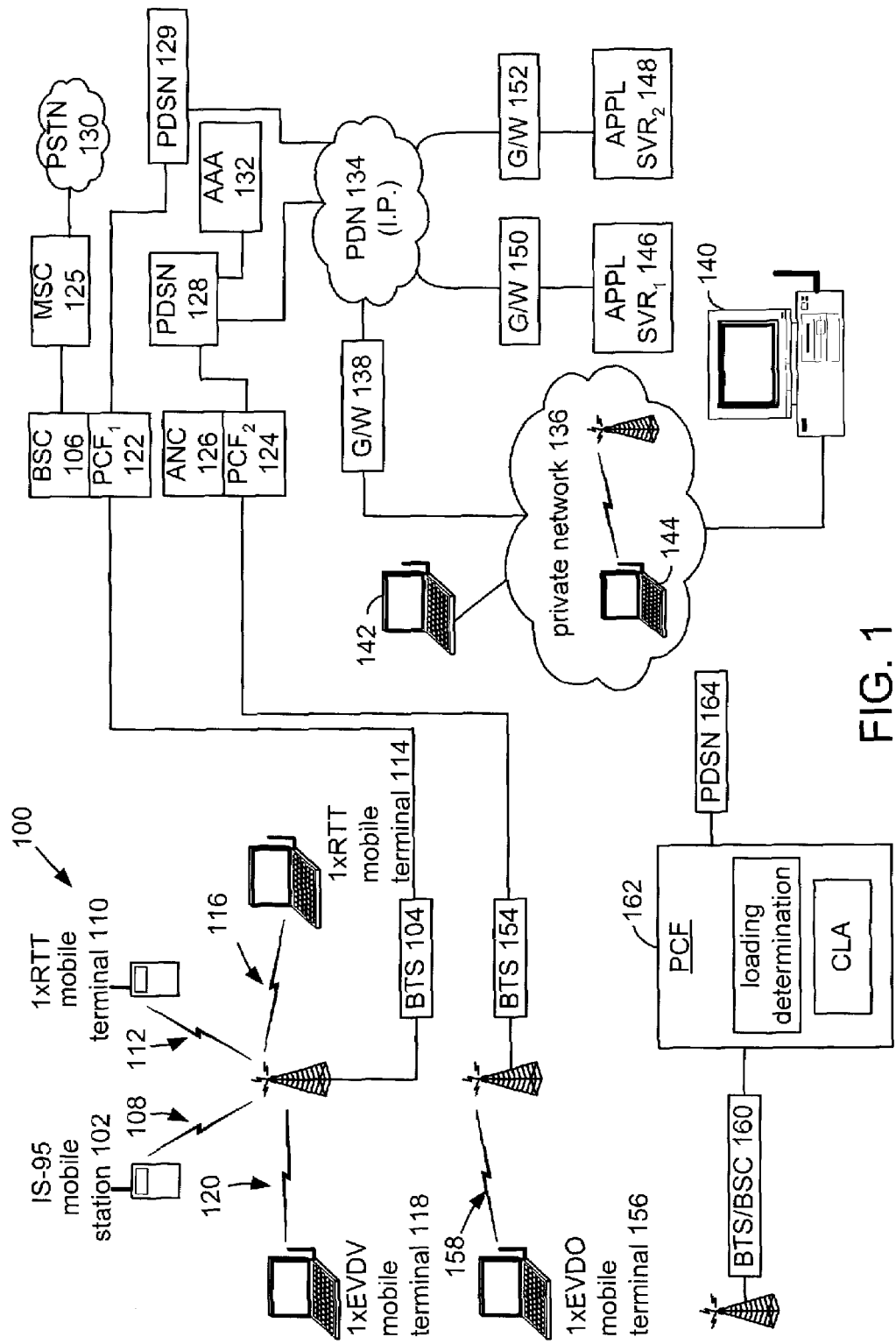
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private data network to communicate with a mobile terminal through a wireless communication link. Such transparent operation with respect to the user is improving access to information and the ability for individuals to communicate to a level that is unprecedented. As discussed before, existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to a Base Station Controller (BSC) 106. More specifically, mobile station 102 communicates with BTS 104 by way of an IS-95 CDMA wireless communication link shown generally at 108. Similarly, a mobile terminal 110 that is capable of supporting both voice and data calls communicates with BTS 104 over a wireless communication link shown generally at 112 and establishes either voice calls or data calls under the cdma2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call according to 1xRTT protocols over a wireless communication link shown generally at 116. Finally, a mobile terminal 118 is engaged in a data call over a wireless communication link, shown generally at 120, according to 1xEVDV protocols. Mobile terminal 118 is a 1xEVDV data and voice optimized terminal for communicating in a data and voice network.

The 1xEVDO network of the described embodiment is a high data rate, high performance and cost effective wireless packet data solution that offers high capacity and is optimized for packet data services. It provides a peak data rate, under current technology, of 2.4 Mbps within one CDMA carrier operating at a bandwidth of 1.2 MHz. Along these lines, the 1xEVDO network is formed to support connectionless communication links in contrast to traditional connection-oriented networks, such as the PSTN, and transmits Protocol Data Units (PDUs) which comprise data packets layered in a protocol such as an IP protocol. In general, the 1xEVDO transmits the PDUs in a bursty fashion notwithstanding its underlying CDMA technology. For hybrid mobile terminals capable of supporting both voice and data calls, the 1xEVDO transmits the PDUs for the data on separate 1.25 MHz channels with respect to voice thereby achieving higher system capacity.

1xEVDO network topology is a little different from traditional wireless networks, including 1xRTT data networks. More specifically, while wireless voice networks and 1xRTT data networks all include the use of a BSC and MSC for call control and call routing, a 1xEVDO system merely communicates through the radio with an ANC that in turn communicates with a packet data serving node, which in turn is coupled to a packet data network such as the Internet.

1xEVDV is also known as cdma2000 Release C. The 1xEVDV specifications are backwards compatible earlier cdma2000 releases, such as 1xRTT, and can operate on the same carrier. 1xEVDV is designed to offer data services a peak data rate of 3.09 Mb/s. In addition, 1xEVDV terminals are capable of both data and voice services. As a result the 1xEVDV network topology is effectively the same as the 1xRTT network topology.

Continuing to examine FIG. 1, BTS 104 is coupled to communicate with BSC 106. As is understood by one of average skill in the art, ANCs and BSCs have similar functionality. Moreover, packet control function (PCF) cards can be installed either within the BSC or within the ANC according to whether the PCF is to communicate with a 1xRTT device or a 1xEVDO device, respectively. As may be seen in the network of FIG. 1, a PCF card 122 is installed within the BSC 106, while a PCF card 124 is installed within an ANC 126. Additionally, in one embodiment of the invention, one ANC/BSC may be formed with 1xRTT and 1xEVDO equipment therewithin to be multi-network capable. The embodiment of FIG. 1 does not show such a configuration although it is to be understood that the BSC and ANC elements may readily be combined. A PCF may also be separate. For example, BTS/BSC 160 is coupled directly to a stand alone PCF 162 that is further coupled to a PDSN 164.

Within BSC 106, according to one embodiment of the present invention, a plurality of different wireless network cards are included to facilitate communications with mobile stations and mobile terminals of differing protocols and types. For example, in the described embodiment, BSC 106 includes circuitry to communicate with mobile station 102 over IS-95 CDMA wireless communication link as shown generally at 108. BSC 106 further includes PCF card 122 for communicating with mobile terminals 110 and 114, utilizing 1xRTT protocols in one described embodiment of the invention. As may be seen, PCF card 122, which is for communicating with 1xRTT protocol devices such as cdma2000 release 0 or release A (generally known as 1xRTT) and cdma2000 release C (generally known as 1xEVDV), is coupled a PDSN 129. BSC 106 is coupled to an MSC 125 to establish a call as is known to one of average skill in the art. PDSN 129, however, receives the data packets from PCF card 122 that are to be transmitted via a packet data network, such as the Internet, or, as shown in FIG. 1, packet data network 134. PCF card 124 installed within ANC 126, however, is for communicating with 1xEVDO devices and is coupled directly to a PDSN 128. Thus, mobile terminal 118 that communicates over wireless communication link 120 according to 1xEVDO communication protocols, communicates with BTS 154 and with PCF card 124 formed within ANC 126 according to one embodiment of the present invention. It is understood, of course, that PCF 124 may readily be formed as a distinct device rather than within a rack of ANC 126 or BSC 106. Moreover, PCF card 124 may communicate with mobile terminal 118 through distinct radio equipment and, thus, through a BTS other than BTS 154 as shown herein.

BSC 106, which includes PCF card 122, communicates with MSC 125. MSC 125 further is coupled to a public switched telephone network (PSTN) 130. Accordingly, calls routed through MSC 125 are directed either to other MSCs (not shown herein) or to external networks by way of PSTN 130. The reference to PSTN herein includes SS7 and other similar "intelligent networks", as well as older and other known telephone networks. Thus, a gateway device (not shown herein) coupled to PSTN 130, may be used to access a packet data network, such as the Internet, for any data calls transmitted according to 1xRTT protocols. 1xEVDO calls, which are processed by PCF card 124, however, are forwarded through PDSN 128 upon authentication by an Authentication, Authorization and Accounting (AAA) server, such as AAA server 132. As may further be seen, packet data network 134 is coupled to a private network 136 by way of a gateway device 138. Private network 136 further is coupled through traditional wire line networks to a user terminal 140 and 142. Moreover, in the described embodiment of the invention, private network 136 includes a wireless LAN formed according to 802.11b protocol standards that facilitates connection to a wireless terminal 144.

Packet data network 134 further is coupled to a plurality of application servers, such as application servers 146 and 148 by way of gateway devices 150 and 152, respectively. Continuing to refer to FIG. 1, ANC 126 further is coupled to a BTS 154, which is in communication with a mobile terminal 156 by way of a 1xEVDO communication link 158.

Any one of the 1xEVDO mobile terminals 156 or 1xEVDV mobile terminal 118 may also communicate through PCF 162 and PDSN 164 whenever they travel through a geographic region that is served by BTS/BSC 160. In the described embodiment, PCF 162 is formed in a distinct device and is not formed as a card within a BSC as was the case with PCF card 122 and PCF card 124. As will be described in greater detail below, the present invention deals in part with the situation in which a packet data session is to be established for a mobile terminal in a group of PDSNs coupled to a PCF that have become overloaded. The PCF is formed to generate a composite loading factor that it transmits to each of the BSC/ANCs to which it is operatively coupled to prompt them to initiate call blocking for a select group of mobile terminals. As may be seen, PCF 162 includes a loading determination module and a composite load analysis (CLA) module. The loading determination module is for receiving and interpreting PDSN loading signals from a PDSN, such as PDSN 164. The CLA is for determining when to send composite loading or other command signals to a BSC to initiate data call blocking for a PDSN or a group of PDSNs.

For each of the above-described mobile terminals and mobile stations, forward and reverse link communications require scheduling by the wireless network control elements, including the base station transceiver sets, the base station controllers and the access network controllers. Methods and designs for forward link scheduling are known and work well because the infrastructure that performs the scheduling also performs the transmission on the forward link. Methods and designs for reverse link scheduling have the added complication that the network infrastructure may determine the reverse link scheduling, but utilizing known approaches for making such determinations tend to take unacceptably long (e.g., 100 milliseconds in some networks). Thus, the various terminals that transmit on the reverse link shown in FIG. 1 include circuitry and logic for assisting the network infrastructure to determine how to schedule a reverse link transmission so as to significantly reduce the amount of time required to perform the reverse link scheduling.

Figure 2A:
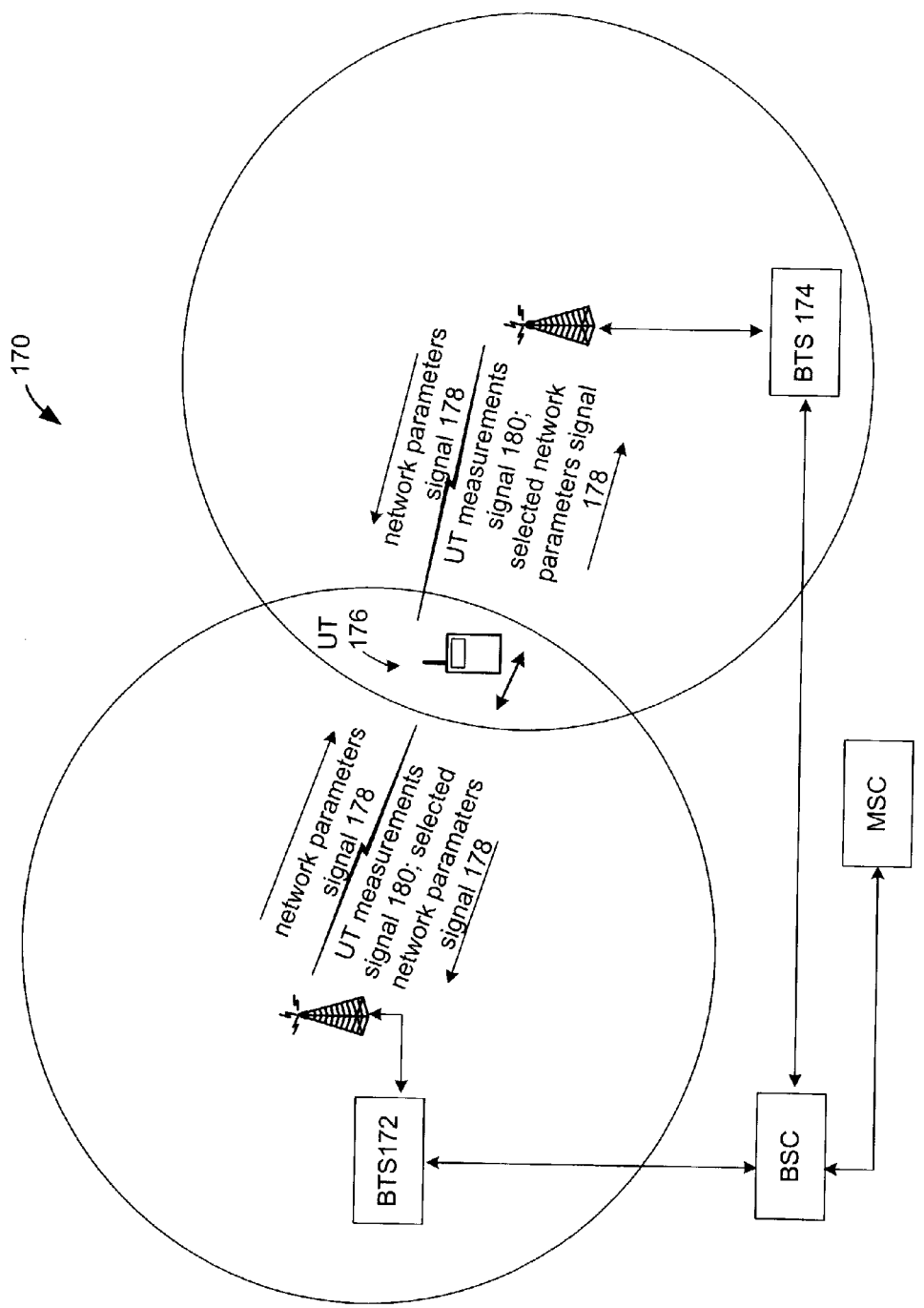
FIGS. 2A and 2B are functional block diagrams of a cellular network illustrating various aspects of the embodiments of the present invention.
Figure 2B:
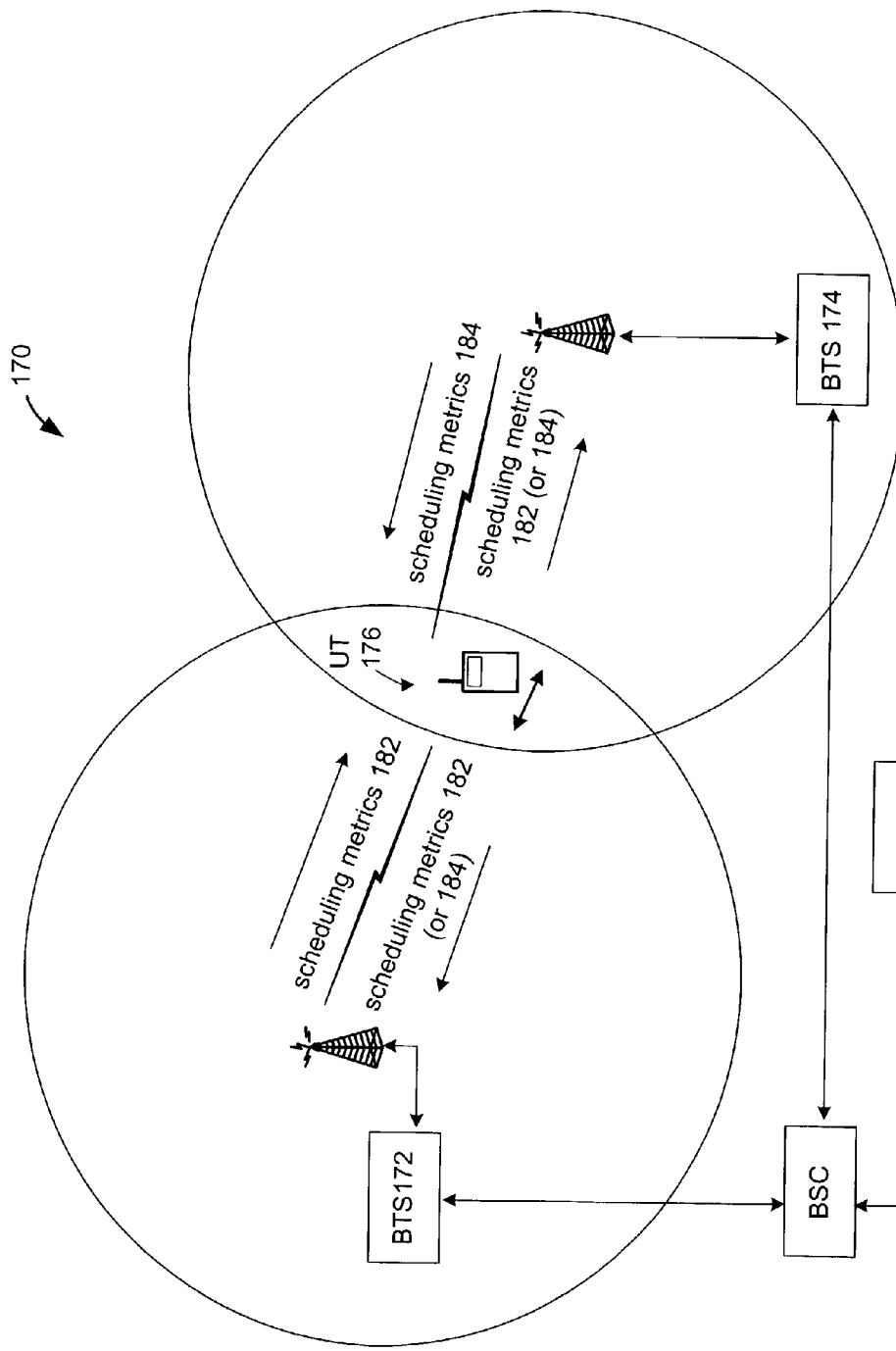

FIGS. 2A and 2B are functional block diagram of a cellular network illustrating various aspects of the embodiments of the present invention. A wireless network 170 comprises a plurality of cells each served by corresponding base station transceiver sets (BTSs). Here, in FIG. 2A, a first cell is served by a BTS 172 while a second cell is served by a BTS 174. In the example shown, both BTSs 172 and 174 are coupled to a common base station controller (BSC) that, in turn, is coupled to a mobile switching center (MSC).

As may also be seen, both BTSs 172 and 174 are in communication with a user terminal 176. In the example, user terminal 176 is traveling from one cell to the other and is in hand-off and, thus, is in communication with both BTSs 172 and 174. Generally, each BTS 172 and BTS 174 performs its own forward link scheduling. Thus, each BTS 172 and 174 determines when to transmit a burst of data, the data rate and a power level for the data for the user terminal 176. The manner in which such scheduling decisions are made can be by any known algorithm, as discussed before, including round robin, an algorithm that minimizes delay, an algorithm that maximizes throughput, or an algorithm that accounts for fairness in light of many factors including service level agreements between the user and the network providers.

In general, for high speed packet data channels on the forward link, only one BTS is actively scheduling the user at a given time. The BTS that schedules the data is the BTS with the strongest forward link connection to the terminal. The terminal uses prior art feedback mechanisms to initiate a fast cell site switch for the packet data channel, when the terminal determines from forward link measurements that another BTS in the terminals active set has a stronger forward link connection. The active set is a list of sectors communicating with the terminal on low rate channels. In general, once a cell site switch occurs, the new target BTS schedules the user in and obtains metrics from the other BTS via the BSC about the amount of data left to send to the terminal, and other scheduler metrics.

In this invention, this step includes transferring the scheduler metrics to the target BTS via the terminal. In this case, the data to be transmitted to the terminal is maintained at both BTSs, even though only one can actively transmit on the high speed data channel. On a cell site switch, the source BTS transfers scheduler metrics to the target BTS via the terminal, where the target BTS can take over scheduling in a seamless and faster manner than relying on the slower backhaul BTS to BSC connections.

Reverse link scheduling, however, is problematic from an outage and interference stand point, because it involves one sector attempting to schedule a terminal that will generate transmissions, without knowing the impact on other neighboring sectors. Knowing all of the factors that merit consideration for that other device, however, is not always easily done with a central controller. Thus, one attempt to reverse link scheduling involves having each BTS generate various data to a central BSC to enable the BSC to determine the reverse link scheduling. One problem with this approach, however, is that the response may be too slow. For example, such a process could, with some current networks, take approximately 100 milliseconds, which is too slow due to the speed of typical transmission data bursts. Thus, the invention includes, as shown here in FIGS. 2A and 2B, each BTS transmitting certain information to the user terminal in handoff to enable it to at least partially decide what data should be used as a part of scheduling the reverse link transmission.

As is shown in FIG. 2, each of the BTSs 172 and 174 transmits a network parameters signal 178 to user terminal 176. While the network parameters signal 178 may comprise many different types of signals, the described embodiment includes received reverse link signal energy (RxEIRP) and rise over thermal (ROT) measurements. It is understood, however, that other equivalent metrics such as signal-to-noise ratio (SNR) may also be utilized.

The user terminal 176, upon receiving the network parameters signal 178 from each of the BTSs 172 and 174, compares the network parameters signal 178 to select between the two BTSs for use in scheduling. Thereafter, the selected set of network parameters signal 178 are transmitted to both BTSs 172 and 174. Additionally, the user terminal 176 also transmits a measurements signal 180 that includes data it selected from the network parameters signal, including ROT and RxEIRP, for the last received forward link transmission. The user terminal 176 further transmits an indication of the amount of data that is in a buffer for transmission and the power level for its last reverse link transmission as a part of measurements signal 180. The amount of data in buffer is important in that the scheduler can use this information to select an appropriate data rate for the data packets. Similarly, the power level provides the scheduler with valuable information about what data rate can be sustained with the excess power. It should be understood that measurements signal 180 is functional in nature and that its contents may readily be distributed over a plurality of signals. In general, measurements signal 180 includes data that the BTSs 172 and 174 require to schedule a reverse link transmission. The actual steps for scheduling a transmission are known. All known variations of scheduling algorithms are specifically included herein.

Generally, a base station seeks to transmit at a high throughput rate to satisfy its customers. Thus, a base station, for example, BTS 172, would tend to schedule a reverse link transmission from the user terminal 176 at a data rate and power level that would not cause outage or excessive interference within the cell served by BTS 172. One problem, however, is that a selected power level and data rate could cause outage or excessive interference in the adjacent cells, for example, the cell served by BTS 174. Thus, rather than have each BTS 172 and 174 transmit all necessary data to a central controller, such as the BSC shown in FIG. 2, the user terminal using logic defined therein, selects the network parameters signal 178 whose values (e.g., ROT and corresponding RxEIRP), when used in scheduling, would not cause outage or excessive interference in any of the cells served by the BTSs with which it is communicating while in hand-off.

FIG. 2B illustrates a further aspect of the present invention. Specifically, as may be seen, BTS 172 and 174 transmit a scheduling message 182 to user terminal 176. User terminal 176 then sends the received scheduling metrics 182 from each BTS 172 and 174 to the other BTS 174 and 172, respectively. Thus, each BTS 172 and 174 can receive and use the scheduling metrics as received from the other BTS by way of the user terminal 176 for scheduling forward link transmissions. One advantage of this approach is that it is faster than traditional back-haul approaches and therefore facilitates scheduling to accommodate a pending hand-off to improve network operation.

Figure 3:
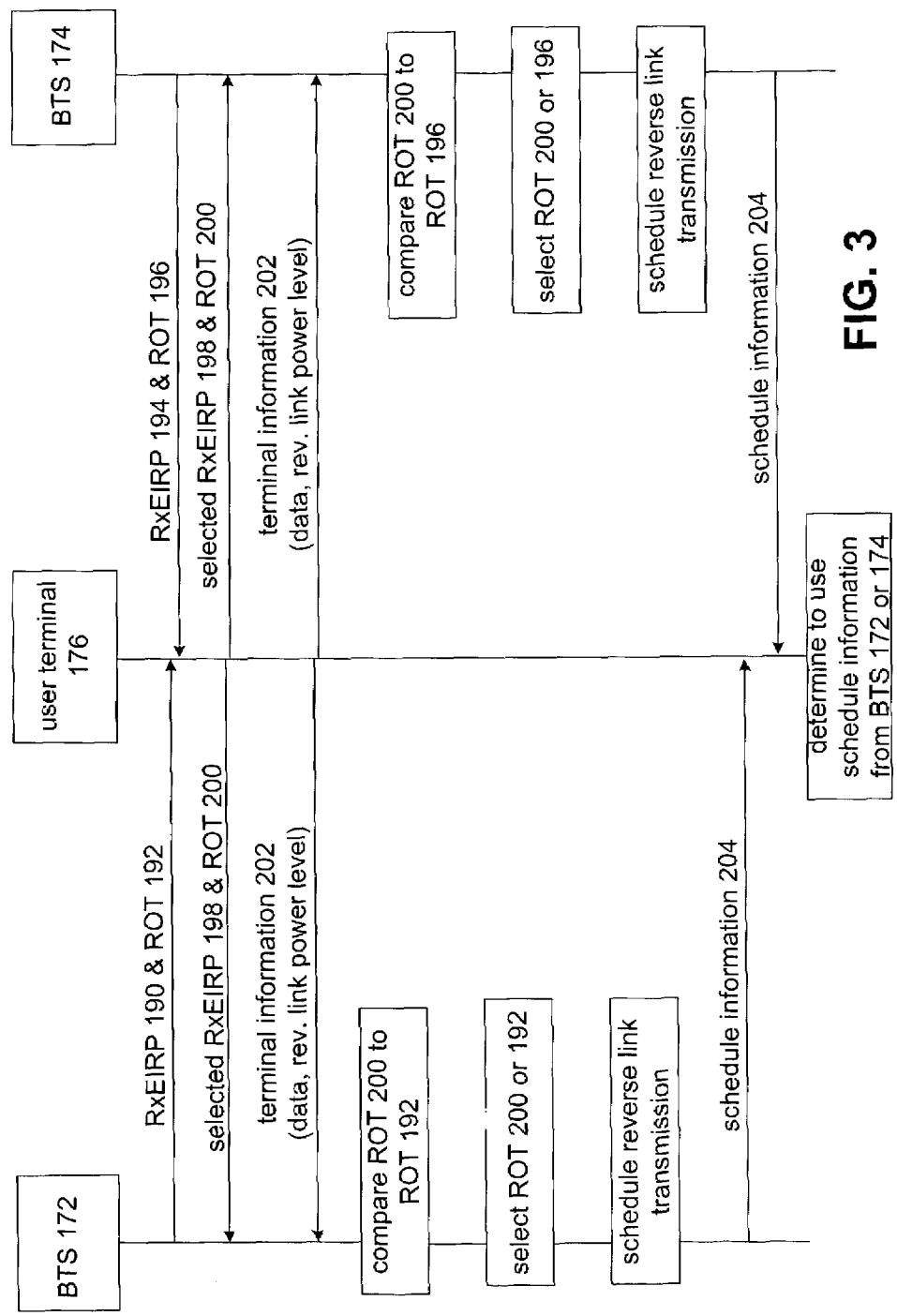
FIG. 3 is a signal sequence diagram illustrating signal flows and corresponding processes in various communication devices in a wireless network according to one embodiment of the present invention.

FIG. 3 is a signal sequence diagram illustrating signal flows and corresponding processes in various communication devices in a wireless network according to one embodiment of the present invention. Initially, BTS 172 transmits a measured RxEIRP value 190 and an ROT value 192 to user terminal 176. Similarly, BTS 174 transmits a measured RxEIRP value 194 and an ROT value 196 to user terminal 176. User terminal 176 then compares the ROT values 192 and 196 to determine which is higher in magnitude and should be used for scheduling a reverse link transmission to reduce the likelihood of causing excessive interference or outage in the cell of all of the BTSs with which user terminal 176 is in communication while it is in a hand-off mode. Thereafter, user terminal 176 transmits the selected RxEIRP value 198 and associated ROT value 200 to each of the BTSs with which it is in communication (here, BTSs 172 and 174).

Additionally, user terminal 176 transmits terminal information 202. Terminal information 202 includes an amount of data in a buffer waiting for transmission and a reverse link power level setting for a recent transmission. The terminal information 202 is shown being transmitted after the selected RxEIRP 198 and ROT 200 are transmitted. The timing of the terminal information 202 is not required to be as shown, however. Rather, the terminal information 202 may be transmitted merely at any time prior to the BTS scheduling the reverse link transmission corresponding to the selected RxEIRP 198 and ROT 200 that it received from the user terminal 176.

After receiving the ROT 200 from user terminal 176, the BTS (here, BTS 172 and BTS 174) each compare the received ROT 200 to the ROT it transmitted to user terminal 176. Thus, BTS 172 compares ROT 200 to ROT 192, while BTS 174 compares ROT 200 to ROT 196. Each BTS 172 and 174 will then select the higher ROT for use in scheduling the reverse link transmission and will then transmit schedule information 204 to the user terminal 176. In the described embodiment of the invention, the user terminal selects the higher ROT of the two values because the higher ROT would typically translate to a lower data rate. Generally, less power is required for lower data rate transmissions. Thus, picking a lower data rate reduces the likelihood of ROT increasing to a point that it interferes with communications from/to other user terminals or mobile stations within the cell or causes outage.

In the described embodiment of the invention in FIG. 3, two BTSs, namely BTS 172 and BTS 174, are in communication with user terminal 176 as it operates in a hand-off mode as it transitions from a cell served by one of the BTSs 172 and 174 to the other. Thus, as is shown, the signal flows and process steps are for the two BTSs. If additional BTSs were in communication with user terminal 176 during hand-off, the signal flows and operation described herein in FIG. 3 would also occur for the additional BTSs. Finally, in the example shown, both BTS 172 and 174 transmit schedule information 204 to user terminal 176. In the described embodiment, user terminal 176 merely accepts the first received schedule information 204. In an alternate embodiment, however, an algorithm may readily be implemented to select among the plurality of schedule information 204 that was received. The schedule information is in general the configurations required for the terminal to transmit on the reverse link high speed data channel. Typically, this information would be the data rate the terminal is required to transmit at, and the start time and end time of the transmission. The actual power of the transmission may be sent or it can be defined within a table that maps transmission power levels to a variety of factors. Using such a table allows the terminal to compute the power required for the data channel relative to its continuous pilot channel and granted data rate.

Figure 4:
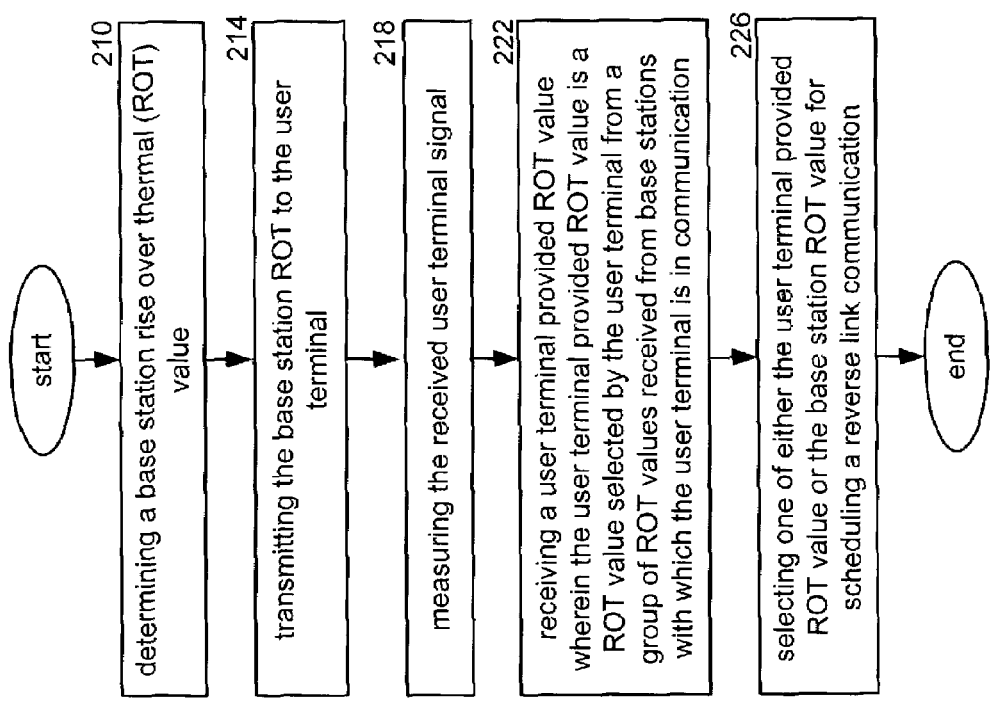
FIG. 4 is a flow chart illustrating a method for scheduling a reverse link transmission according to one embodiment of the present invention.

FIG. 4 is a flow chart illustrating a method for scheduling a reverse link transmission according to one embodiment of the present invention. As described herein, the method of FIG. 4 is one performed by a base station. Initially, the invention includes determining a base station rise over thermal (ROT) value (step 210). Thereafter, the invention includes transmitting the base station ROT to the user terminal (step 214). Since the ROT is a measurement that can be taken periodically, and would be required for any terminal using this invention, the ROT value can be continuously transmitted on a common forward link channel, such that every terminal has access to this information at any time. The method further includes measuring the received user terminal signal energy (step 218). The order of measuring the received signal is not critical and can be varied from the order shown herein FIG. 4.

Once the base station measured ROT has been sent to the user terminal, the invention includes receiving a user terminal provided ROT value wherein the user terminal provided ROT value is a ROT value selected by the user terminal from a group of ROT values received from base stations with which the user terminal is in communication (step 222). Finally, the invention includes selecting one of either the user terminal provided ROT value or the base station ROT value for scheduling a reverse link communication (step 226).

FIG. 5 is a flow chart illustrating a method performed by a user terminal as a part of scheduling a reverse link transmission according to one embodiment of the present invention. As has been described previously, the user terminal facilitates fast reverse link scheduling by deciding what ROT values and RxEIRP values should be used for the reverse link scheduling when a base station determines a data rate (and, therefore, a corresponding or required power level). Accordingly, the invention includes the user terminal receiving rise over thermal (ROT) values from at least one base station wherein the user terminal receives only one ROT value from only one base station when the user terminal is not in hand-off and receives at least two ROT values from at least two base stations when the mobile terminal is in hand-off wherein the user terminal receives an ROT value from each base station with which it is communicating (step 210).

After receiving the ROT values from a plurality of base stations whenever the user terminal is in hand-off, the next step includes selecting a ROT value from each of the received ROT values (step 214). If the user terminal is not in hand-off, it will receive only one ROT value from the one base station with which it is communicating and will therefore select the one ROT value.

In addition to receiving ROT values from the base station with which the user terminal is communicating, the invention includes receiving signal quality related metrics from each base station with which the user terminal is communicating (step 218). Thus, after selecting an ROT value, the next step includes the user terminal transmitting the selected ROT value and a corresponding signal quality metric to each of the base stations with which the user terminal is communicating (step 222). In the example of FIG. 3, for example, if the selected ROT value is the one transmitted by BTS 172, then the user terminal will transmit the ROT value from BTS 172, as well as the RxEIRP value (RxEIRP 198), back to each of the base stations with which it is communicating. In the example of FIG. 3, the user terminal sends the selected ROT value and corresponding RxEIRP value to BTSs 172 and 174.

FIG. 6 is a flow chart an alternate embodiment of the invention for scheduling reverse link transmissions as performed by a base station transceiver set. The first step of the embodiment of the invention in FIG. 6 includes measuring network parameters, including a base station measured signal quality metric (step 224). While the specific embodiment of the invention includes measuring the rise over thermal value and measuring the received signal energy (typically from the pilot channel) for a received reverse link transmission, other equivalent metrics may be measured and utilized to enable a user terminal to assist in a fast reverse link scheduling process as is disclosed herein. One of average skill in the art can readily determine what metrics are to be measured and used in the inventive process.

After measuring the network parameters, the invention includes transmitting the base station measured network parameters to the user terminal (step 228). This enables the user terminal to make initial determination about which base station will schedule the reverse link transmission for a user terminal that is in hand-off. Prior to scheduling the next reverse link transmission, the base station needs to know certain user terminal conditions. For example, in the described embodiment, the base station considers a user terminal signal quality metric as well as an amount of data that the user terminal has buffered for transmission. Thus, one required step, though not required to be performed in a particular order (so long as it is before the scheduling step), includes receiving user terminal measured signal quality metrics from the user terminal (step 232).

The user terminal then selects and transmits a group of base station measured network parameters. Thus, the next step includes receiving a user terminal selected base station measured network parameters for scheduling wherein the user terminal selected base station measured network parameters are the network measured parameters of a base station that the user terminal determines should be selected for determining reverse link scheduling by the base station (step 236). At this point, the base station has received all it requires to schedule the next reverse link transmission. Thus, the inventive process finally includes scheduling a reverse link communication (step 240).

In the described embodiments of the invention, the specific network parameters used for the fast reverse link scheduling include rise-over-thermal and received signal energy. Other equivalent metrics may also be used. When the base station receives the user terminal selected network parameters, it decides whether to use the user terminal selected parameters or its own. In one embodiment of the invention, the base station receives the ROT from the user terminal and compares it to the ROT the base station transmitted to the user terminal. If the received ROT from the user terminal is the ROT the base station transmitted to the user terminal, it merely uses its own current ROT for scheduling. If, however, the ROT is not its own ROT, then the base station uses the ROT received from the user terminal for scheduling. Generally, the user terminal selects the higher ROT. Accordingly, if the received ROT is not the base station's own ROT, then the received ROT is higher than its own ROT at the time the ROT information was sent to the user terminal and is the one the base station uses for scheduling. However in one exception, if the base station determines that its ROT is not the selected ROT, and the ROT received from the terminal is now lower than the current ROT at the base station, the base station then uses its own current higher ROT value. Similarly, if the base station receives its own ROT, however, it uses the received ROT, except in one circumstance. If its own ROT has risen in magnitude since it transmitted the ROT to the user terminal, the base station uses the present ROT value rather than the received ROT value (which it originally transmitted to the user terminal).

The measured signal energy at the receiver is proportional to the transmit power of the terminal and the path loss between the terminal and the base station. Therefore, the measured signal energy can be used to determine the path loss offset between base stations if the measurement was made at the same time. Thus one requirement of the reverse link measured signal energy is that the network is set up such that the base stations measure this at the same time. That is, the measurement time period is synchronized. If a base station receives a ROT value that corresponds to the ROT value it sent, then it does nothing more with the received signal energy that is also feedback by the user terminal. If however, the base station determines that it is not the selected base station, it uses the RxEIRP value feedback and its own RxEIRP value corresponding to the same time, to determine a path loss offset between itself and the selected base station. This path loss offset is used in the scheduling algorithm along with the selected ROT to ensure that the overall system outage is maintained within acceptable bounds when the sector schedules the user for transmission. This path loss information is necessary because a user may be close to another sector, hence attempting to schedule that user in with the other sectors ROT value is not sufficient to prevent outage, an indication of the path loss between the user and that sector is also necessary. Hence, the offset between the two sectors is used to compute the path loss correctly.

Once the user is scheduled, the base station transmits the relevant information to the user, such as data rate, and transmission start and stop time or duration. However, it is conceivable that two or more base stations may schedule the user at the same time. If this occurs, in one embodiment of this invention, the user terminal simply transmits at the lowest requested rate. In another embodiment, the terminal may choose to transmit at the rate requested by the base station corresponding to the highest reported ROT. In demodulating the reverse link transmission, all base stations can perform blind rate detection, or a rate indication channel may be transmitted in tandem with the high speed data channel. The rate indication channel is a control channel that provides information on the high speed channel, to eliminate the need for blind rate detection.

Figure 7:
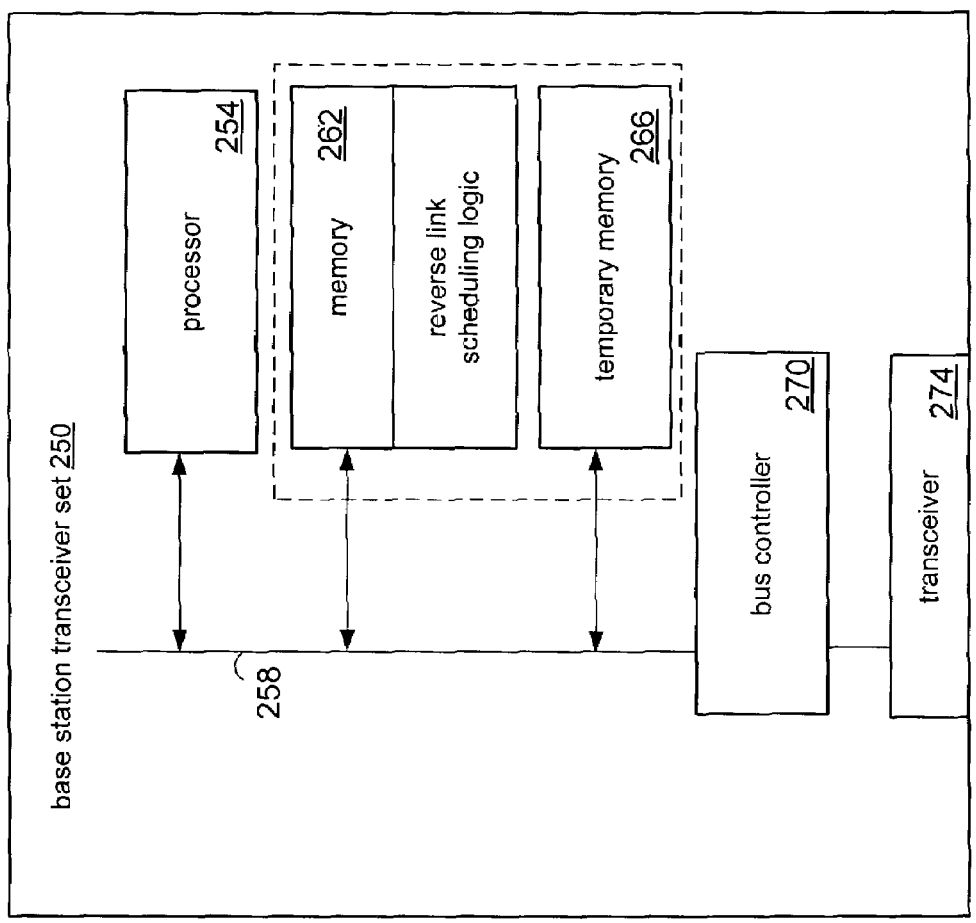
FIG. 7 is a functional block diagram of base station transceiver set formed according to one embodiment of the present invention.

FIG. 7 is a functional block diagram of base station transceiver set formed according to one embodiment of the present invention. A base station transceiver set 250 includes a processor 254 that is coupled to communicate over a bus 258. A memory 262 and a temporary memory 266 further are coupled to communicate over bus 258. Memory 262 includes computer instructions that generally define the operating logic of base station transceiver set 250 and specifically includes computer instructions that define operational logic for fast reverse link scheduling as described herein in the various diagrams, including the signal flow diagram of FIG. 3 and the flow charts of FIGS. 4-6. Temporary memory 266 provides memory for temporarily storing computer instructions and data for fast access by processor 254. Generally, processor 254 retrieves computer instructions and data permanently stored in memory 262 and executes the computer instructions to cause base station transceiver set 250 to operate according to the logic defined by the computer instructions. A bus controller 270 controls communications over bus 258 as is known by one of average skill in the art. Transceiver 274 is a port through which base station transceiver set 250 communicates with other external devices. For example, transceiver 274 specifically includes a hard wired port for communicating with a base station controller over a wired interface. Transceiver 274 also includes a radio front end for communicating with user terminals and mobile stations over a wireless RF medium. Any known RF front end design having data rate and required power levels for base station transceiver sets may be used as a part of an RF front end within transceiver 274.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a wireless communication network for selecting a BTS for scheduling a reverse link communication, comprising:
   determining a base station rise over thermal (ROT) value;
   transmitting the base station ROT value to a user terminal;
   receiving user terminal measured signal and noise related measurements from the user terminal;
   receiving a user terminal provided ROT value wherein the user terminal provided ROT value is a ROT value selected by the user terminal from a group of ROT values received from base stations with which the user terminal is in communication; and
   selecting one of the user terminal provided ROT value or the base station ROT value for scheduling a reverse link communication.

2. The method of claim 1 further including measuring and sending a reverse link signal quality metric to the user terminal.

3. The method of claim 1 further including transmitting the base station ROT value over one of a common or dedicated channel.

4. The method of claim 1 further including receiving user terminal specific parameters from the user terminal.

5. The method of claim 4 wherein the user terminal specific parameters include an amount of data that is to be transmitted.

6. The method of claim 4 wherein the user terminal specific parameters include a transmitted power level.

7. The method of claim 4 including evaluating the selected ROT value, a user terminal's specific parameters including an amount of data that the user terminal seeks to transmit and the user terminal's reverse link power level as a part of scheduling the reverse link communication from the user terminal.

8. The method of claim 7 further including transmitting scheduling information to the user terminal.

9. The method of claim 8 wherein the scheduling information specifies a data rate and a corresponding power value that is below a specified value.

10. The method of claim 8 wherein the scheduling information specifies a data rate for the reverse link transmission.

11. The method of claim 8 wherein the scheduling information specifies the reverse link transmission power level that is below a specified value.

12. A method performed by a user terminal in a wireless communication network as a part of scheduling a reverse link communication, comprising:
    receiving rise over thermal (ROT) values from at least one base station wherein the user terminal receives only one ROT value from only one base station when the user terminal is not in hand-off and receives at least two ROT values from at least two base stations when the user terminal is in hand-off wherein the user terminal receives an ROT value from each base station with which it is communicating;
    selecting a ROT value from each of the received ROT values;
    receiving signal quality related metrics from each base station with which the user terminal is communicating; and
    transmitting the selected ROT value and a corresponding signal quality metric to each of the base stations with which the user terminal is communicating.

13. The method of claim 12 further comprising receiving scheduling information from a plurality of base stations and determining which received scheduling information should be used for upcoming reverse link transmissions.

14. A method in a wireless communication network base station for selecting a BTS for scheduling a reverse link communication, comprising:
    measuring rise over thermal (ROT) values including a base station measured signal quality metric;
    transmitting the base station measured ROT values to a user terminal;
    receiving user terminal measured signal quality metrics from the user terminal;
    receiving a user terminal selected base station measured ROT values for scheduling wherein the user terminal selected base station measured ROT values are the ROT values of a base station that the user terminal determines should be selected for determining reverse link scheduling by the base station; and
    scheduling a reverse link communication.

15. The method of claim 14 further including determining whether to use the received user terminal selected base station measured ROT values for scheduling or whether to use the base station's own measured ROT values for scheduling.

16. The method of claim 15 further including, if the received measured ROT values are to be used for scheduling, calculating an offset signal quality metric, which offset signal quality metric is a function of a received user terminal selected signal quality metric.

17. The method of claim 15 wherein the signal quality metric is a signal-to-noise ratio.

18. The method of claim 15 wherein the method in the base station includes selecting the highest ROT value for scheduling.

19. A base station transceiver set (BTS), comprising:
a bus for carrying computer instructions within the BTS;
a processor coupled to the bus; and
a memory also coupled to the bus, the memory including computer instructions defining operational logic of the BTS wherein the processor retrieves and executes the computer instructions from the memory, the computer instructions defining logic for:
  determining a base station rise over thermal (ROT) value;
  transmitting the base station ROT to the user terminal;
  receiving and processing user terminal measured signal and noise related measurements from a user terminal;
  receiving and processing a user terminal provided ROT value wherein the user terminal provided ROT value is a ROT value selected by the user terminal from a group of ROT values received from base stations with which the user terminal is in communication; and
  selecting one of the user terminal provided ROT value or the base station ROT value for scheduling a reverse link communication.

20. The base station of claim 19 wherein the computer instructions further define logic for sending a signal and noise related measurement to the user terminal.

21. The base station of claim 19 wherein the computer instructions further define logic for transmitting the base station ROT over one of a common or dedicated channel.

22. The base station of claim 19 wherein the computer instructions further define logic for receiving user terminal specific parameters from the user terminal.

23. The base station of claim 19 wherein the computer instructions further define logic for evaluating the selected ROT value, a user terminal's specific parameters including an amount of data that the user terminal seeks to transmit and the user terminal's reverse link power level as a part of scheduling the reverse link communication from the user terminal.

24. The base station of claim 19 wherein the computer instructions further define logic for transmitting scheduling information to the user terminal.

25. The base station of claim 19 wherein the computer instructions further define logic for generating scheduling information that specifies when the reverse link transmission is to occur.

26. The base station of claim 19 wherein the scheduling information specifies a data rate for the reverse link transmission.

27. The base station of claim 19 wherein the scheduling information specifies the reverse link transmission power level.

* * * * *

UNITED STATES PATENT AND TRADEMARK OFFICE
CERTIFICATE OF CORRECTION

| | | |
|---|---|---|
| PATENT NO. | : 7,602,722 B2 | Page 1 of 1 |
| APPLICATION NO. | : 10/310401 | |
| DATED | : October 13, 2009 | |
| INVENTOR(S) | : Ashvin Chheda | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1611 days.

Signed and Sealed this

Fifth Day of October, 2010

David J. Kappos
*Director of the United States Patent and Trademark Office*